United States Patent
Lee et al.

(10) Patent No.: US 12,533,445 B2
(45) Date of Patent: Jan. 27, 2026

(54) BIODEGRADABLE POROUS MEMBRANE FOR GENERATING SCAFFOLD-FREE BIOLOGICAL ASSEMBLIES

(71) Applicant: Rutgers, The State University of New Jersey, New Brunswick, NJ (US)

(72) Inventors: Ki-Bum Lee, Monmouth Junction, NJ (US); Letao Yang, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 46 days.

(21) Appl. No.: 17/664,792

(22) Filed: May 24, 2022

(65) Prior Publication Data

US 2022/0370687 A1 Nov. 24, 2022

Related U.S. Application Data

(60) Provisional application No. 63/192,124, filed on May 24, 2021.

(51) Int. Cl.
 *A61L 27/56* (2006.01)
 *A61L 27/02* (2006.01)
 *A61L 27/14* (2006.01)

(52) U.S. Cl.
 CPC ............ *A61L 27/56* (2013.01); *A61L 27/025* (2013.01); *A61L 27/14* (2013.01); *A61L 2400/12* (2013.01)

(58) Field of Classification Search
 None
 See application file for complete search history.

(56) References Cited

U.S. PATENT DOCUMENTS

| 9,733,165 | B2 | 8/2017 | Chiu et al. | |
| 9,782,439 | B2 | 10/2017 | Nagaya et al. | |
| 2003/0215712 | A1* | 11/2003 | Feddrix | H01M 4/50 |
| | | | | 429/223 |
| 2014/0037696 | A1* | 2/2014 | Schaffer | G01N 33/5073 |
| | | | | 435/174 |
| 2021/0015975 | A1* | 1/2021 | Lee | A61L 27/227 |

FOREIGN PATENT DOCUMENTS

| WO | 2017217803 A1 | 12/2017 | |
| WO | WO-2019099685 A1 * | 5/2019 | ............ A61L 31/06 |

OTHER PUBLICATIONS

Kai, K., et al., J. Am. Chem. Soc. 130: 15938-15943 (2008). (Year: 2008).*
Choudhury, Aaheli Roy: "Cell Isolation", Mater Methods, 2017;7:2260, DOI://dx.doi.org/10.13070/mm.en.7.2260.
Kolnik, et al: "Vacuum-Assisted Cell Loading Enables Shear-Free Mammalian Microfluidic Culture", Lab Chip, 2012, 12:4732-4737.
Ostuni, et al: "Patterning Mammalian Cells Using Elastomeric Membranes", Langmuir, 2000 16, 7811-7819.

* cited by examiner

*Primary Examiner* — David J Blanchard
*Assistant Examiner* — Daniel F Coughlin
(74) *Attorney, Agent, or Firm* — FOX ROTHSCHILD LLP

(57) ABSTRACT

A three dimensional scaffold for generating cell or protein assemblies. This degradable scaffold can be applied to various types of cells. Also disclosed are methods of treating a condition by implanting the protein or cell assembly prepared according to the method described herein.

16 Claims, 2 Drawing Sheets

BIODEGRADABLE POROUS MEMBRANE FOR GENERATING SCAFFOLD-FREE BIOLOGICAL ASSEMBLIES

STATEMENT REGARDING FEDERALLY SPONSORED RESEARCH OR DEVELOPMENT

This invention was made with government support under Grant Nos. 1DP20D006462-01, 1R01DC016612-01, 1R21NS085569-01 and CHE-1429062 awarded by the National Institutes of Health and National Science Foundation. The government has certain rights in the invention.

FIELD

The present disclosure relates to a technology of generating scaffold-free cell and protein assemblies for tissue repair/regeneration and disease modeling.

BACKGROUND

The recent evolution of scaffold-free tissues for tissue modeling and regenerative medicine has been driven by the need to recapitulate cell-dense natural tissues and to avoid undesired scaffold side-effects during cell delivery. Generation of scaffold-free tissues has been mostly based on thermoresponsive polymer-based cell sheet engineering and 3D spheroid-based bioprinting. Ultimately, these approaches are limited in controlling the final tissue structures, as cells must remain in an ordered structure in the absence of scaffold support.

Successful tissue engineering approaches for modeling or replacing diseased tissues usually requires recapitulation of heterogeneous cellular environments. If tissue models are over-simplified, therapies tested on the disease models may not be well translated into animal models or clinical studies. Controlling heterogeneous cell assemblies in tissues has been approached by patterning scaffolds; however, decoupling the effects from heterogenous extracellular matrix from patterned cells has proved extremely challenging. Utilizing physical forces can control scaffold-free cell assemblies without introducing heterogenous ECM microenvironment; however, current methods either require low ionic forces, is difficult to manipulate heterogeneous cell types or limited in resolution. Alternatively, cell membrane modification with biorecognition molecules such as DNA can be generally applied for precise scaffold-free 3D cell assembly, but extensive modification of cell membranes and requiring DNAse to remove DNA linkers introduce undesired variables to the tissues formed. Although these techniques address specific limitations of the controllable scaffold-free cell assembly, they do not provide a robust and general pathway to achieve precisely patterned scaffold-free tissues that do not rely on specific cellular or extracellular modifications.

There exists a need for a reliable method that provides a robust and general pathway to achieve precisely patterned scaffold-free cell assemblies that do not rely on specific cellular or extracellular modifications.

SUMMARY

A biodegradable nano porous (BNP) membrane is disclosed having continuous nano-porosities and stimuli-triggered fast biodegradation that provides a unique tool for developing cell or protein assemblies. Further, it can be broadly applied to many other fields by providing a retrievable filtration platform.

An aspect of the disclosure provides a scaffold for forming a cell or protein assembly. The scaffold contains one or more layers of porous particles having an average diameter ranging from about 200 nm to about 100 μm. The particles are so assembled that the scaffold has pores with an average diameter ranging from about 5 nm to about 5 μm. Further, the pores are capable of supporting vacuum flow from a first surface of the scaffold to an opposite second surface with suitable filtration speed.

In some embodiments, the particles are composed of a plurality of nano sheets. In some embodiments, the particles are degradable by a reducing agent.

In some embodiments, the scaffold contains one or more groups of removable masks covering a first portion of one or more portions of the first surface of the scaffold. In some embodiments, the masks are so configured that unmasked area on the first surface is patterned to the shape of a tissue.

Another aspect of the disclosure provides a method of forming a cell or protein assembly. The method generally includes (a) depositing protein or a first group of cells on a first surface of the scaffold described herein; and (b) applying vacuum or negative pressure to a second surface opposite to the first surface of the scaffold. The protein and cells can also be deposited to the scaffold sequentially to form protein-cell hybrid patterns.

In some embodiments, the method further includes controlling the density of the protein or the first group of cells and/or the time of depositing the protein or cells on the first surface of the scaffold.

In some embodiments, the scaffold comprises one or more groups of removable masks covering one or more portions of the first surface of the scaffold, and the masks are so configured that unmasked area on the first surface is patterned to the shape of a tissue. In some embodiments, the method includes alternating the depositing of protein or different groups of cells with the removal of different groups the masks.

Another aspect of the disclosure provides a cell or protein assembly prepared according the method describe herein.

Another aspect of the disclosure provides a method of treating a condition in a subject, comprising implanting to the subject in need thereof a cell or protein assembly prepared according to the method describe herein. In some embodiments, the condition is an open wound.

DETAILED DESCRIPTION

Various embodiments of this patent document discloses a novel biodegradable nano porous (BNP) scaffold for generating cell sheets or tissue patterns. The scaffold is unique in that it creates scaffold-free cell assemblies and controls cell patterns precisely. In addition, the process of generating cell assemblies is fast and can be generally applied to unlimited cell types.

Some examples of the present disclosure will now be described more fully hereinafter with reference to the accompanying drawings, in which some, but not all examples of the disclosure are shown. Indeed, various aspects of the disclosure may be embodied in many different forms and should not be construed as limited to the examples set forth herein. Rather, these examples are provided so that this disclosure will be thorough and complete and will fully convey the scope of the disclosure to those skilled in the art.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "about" as used herein refers to the referenced numeric indication plus or minus 10% of that referenced numeric indication.

The term "subject" as used herein refers to an animal or a human.

An aspect of this patent document provides a three-dimensional scaffold for forming a cell assembly. The scaffold is composed of porous particles having an average diameter ranging from about 200 nm to about 100 µm. The particles are so configured that the pores of the membrane scaffold have an average diameter ranging from about 5 nm to about 5 µm.

A suitable range of pore size promotes efficient assembly of cells on the scaffold surface and meanwhile allows filtration of excess material. The pores of the membrane scaffold include those of the particles and those between the particles. In some embodiments, the average size of the pores (in the particles and between the particles) independently ranges from about 5 nm to about 2 µm, 5 nm to about 1 µm, 50 nm to about 2 µm, 50 nm to about 1 µm, 100 nm to about 2 µm, 200 nm to about 2 µm, 500 nm to about 2 µm, from about 50 nm to about 300 nm, from about 50 nm to about 200 nm, from about 50 nm to about 150 nm, from about 80 nm to about 400 nm, from about 80 nm to about 200 nm, from about 80 nm to about 150 nm, from about 100 nm to about 200 nm, or from about 100 nm to about 150 nm. Further nonlimiting examples of the size of the pores include about 5 nm, about 10 nm, about 20 nm, about 50 nm, about 100 nm, about 200 nm, about 500 nm, about 800 nm, about 1 µm, about 2 µm, about 3 µm, and about 5 µm.

Figure 1:
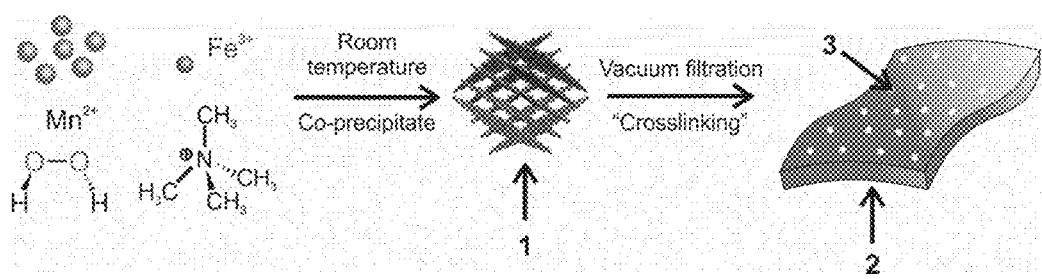
FIG. 1 illustrates a redox reaction between $MnCl_2$ and $H_2O_2$ to form $MnO_2$ particle 1. Subsequent filtration through a sieve of suitable size leads to the formation of a membrane 2 composed of dark-colored $MnO_2$ microparticles. The membrane includes a plurality of pore 3.

Various materials can be employed to prepare the porous particles. The 3-D porous particles are preferably assembled from 2-D nano sheets which lead to faster filtration speed of the 3-D particles than 1-D rods or 2-D sheets. The 3-D particles composed of 2-D nano sheets also have a more desirable degradation profile than 0-D or 1D materials. In some embodiment, the 2-D nano sheets are assembled in random directions in the each of the particles. In some embodiment, the particle is composed of nano sheets of manganese dioxide ($MnO_2$). As illustrated in FIG. 1 and the examples, the doped particles 1 can be prepared via a redox reaction between $MnCl_2$ and $H_2O_2$. Each of the particles is composed of nano-sheets assembled in a non-ordered manner. Subsequent filtration through a sieve of suitable size leads to the formation of a membrane 2 composed of dark-colored $MnO_2$ microparticles. The membrane contains multiple nanopores 3. Depending on the sieve (e.g. a polymer film having predesigned pore size), the microparticles may have an average diameter ranging from about 100 nm to about 200 µm, from about 100 nm to about 100 µm, from about 200 nm to about 100 µm, from about 400 nm to about 100 µm, from about 800 nm to about 100 µm, from about 100 nm to about 50 µm, from about 100 nm to about 10 µm, from about 100 nm to about 1 µm, from about 500 nm to about 50 µm, from about 500 nm to about 10 µm, from about 500 nm to about 1 µm, from about 800 nm to about 50 µm, or from about 800 nm to about 10 µm. Further nonlimiting examples of the average diameter include about 100 nm, about 200 nm, about 300 nm, about 500 nm, about 800 nm, about 1 µm, about 2 µm, about 3 µm, about 5 µm, about 10 µm, about 20 µm, about 50 µm, about 80 µm, about 100 µm, and about 200 µm. If the microparticles are too small, the filtration speed will be significantly reduced. On the other hand, when the microparticles are too large, the surface of the membrane will be very heterogeneous and the mechanical stability of membrane during transfer will be reduced.

The nano-sheets of the particles have an average lateral size ranging from about 1 nm to 1 µm. In some embodiments, the average lateral size ranges from about 1 nm to 500 nm, from about 10 nm to about 100 nm, from about 20 nm to about 100 nm, from about 20 nm to about 500 nm, from about 20 to about 1000 nm, from about 40 nm to about 500 nm, from about 40 nm to about 1000 nm, from about 10 nm to 200 nm, from about 20 nm to 200 nm, from about 20 nm to 150 nm, from about 20 nm to 100 nm, or from about 30 nm to 80 nm. In some embodiments, the individual nano-sheet has a thickness of less than 5 nm. In some embodiments, the thickness ranges from about 0.2 to about 5, from about 0.5 to 5, from about 1 to 4, or from about 1 to 2 nm.

The membrane scaffold may be composed of one or multiple layers of microparticles. The layered membrane structure has improved mechanical stability. The filtration speed through membrane pores can also be controlled. In some embodiments, the scaffold is composed of two, three or more layers of 2-D nano sheets The BNP membrane scaffold is generally stable in normal media conditions even under extreme pH conditions for an extended period of time (e.g. over one, two or more months). Meanwhile, the membrane can be readily degraded under suitable condition. Such selective degradation has not been well demonstrated in conventional porous membranes and directly allows the flexibility on the controlled assembly of cells, growth of tissues and cleavage of the substrate on demand. For instance, the BNP $MnO_2$ membrane can have a fast degradability (>5, >10, or >15 mg/s) under 1 mg/ml vitamin C buffered solution, which is well-tolerated by four representative cell lines [e.g., adipose-derived mesenchymal stem cells (ADSC)]. These BNP membranes thus represent one of the fastest degradable and water stable membranes under biocompatible conditions.

The degradation speed can be modulated by doping ions into the microparticle. Exemplary ion dopants include iron (e.g. $Fe^{3+}$), zinc and lithium. The dopant ranges from about 0.1% to about 5%, from about 0.5% to about 5%, from about 0.5% to about 2%, from about 0.5% to about 1.5%, from about 0.5% to about 1%, or from about 1% to about 1.5% in the microparticle by weight. In some embodiments, the dopant is iron.

For the purpose of developing cell sheets or tissues or forming heterogeneous cellular patterns, the membrane can further include one, two, three or more groups of masks. Each group can contain one or more masks pre-designed into a particular shape to cover one or more portions of a surface of the membrane. When vacuum is applied to the opposite surface, the cells are assembled at only the unmasked area of the surface. Accordingly, cell sheets or tissues can be prepared in various shapes including for example circular, bi-circular, tri-circular, cross, triangular, square, vascular, and cell micro-array.

When cell depositing and mask removal are performed in stages, heterogeneous cell patterning is achieved. For instance, a membrane can have one, two, three or more groups of masks to be removed. After a first group of cells are assembled, a first group of one or more removable masks are removed to expose additional surface area to deposit a second group of cells. Thereafter, a second group of one or more removable masks are removed to expose additional surface area to deposit a third group of cells. This sequence can be continued if necessary, and the removal of masks of group "n" mask is followed by the deposit of cells of group "n+1", wherein n is an integer greater than 0.

Figure 2:
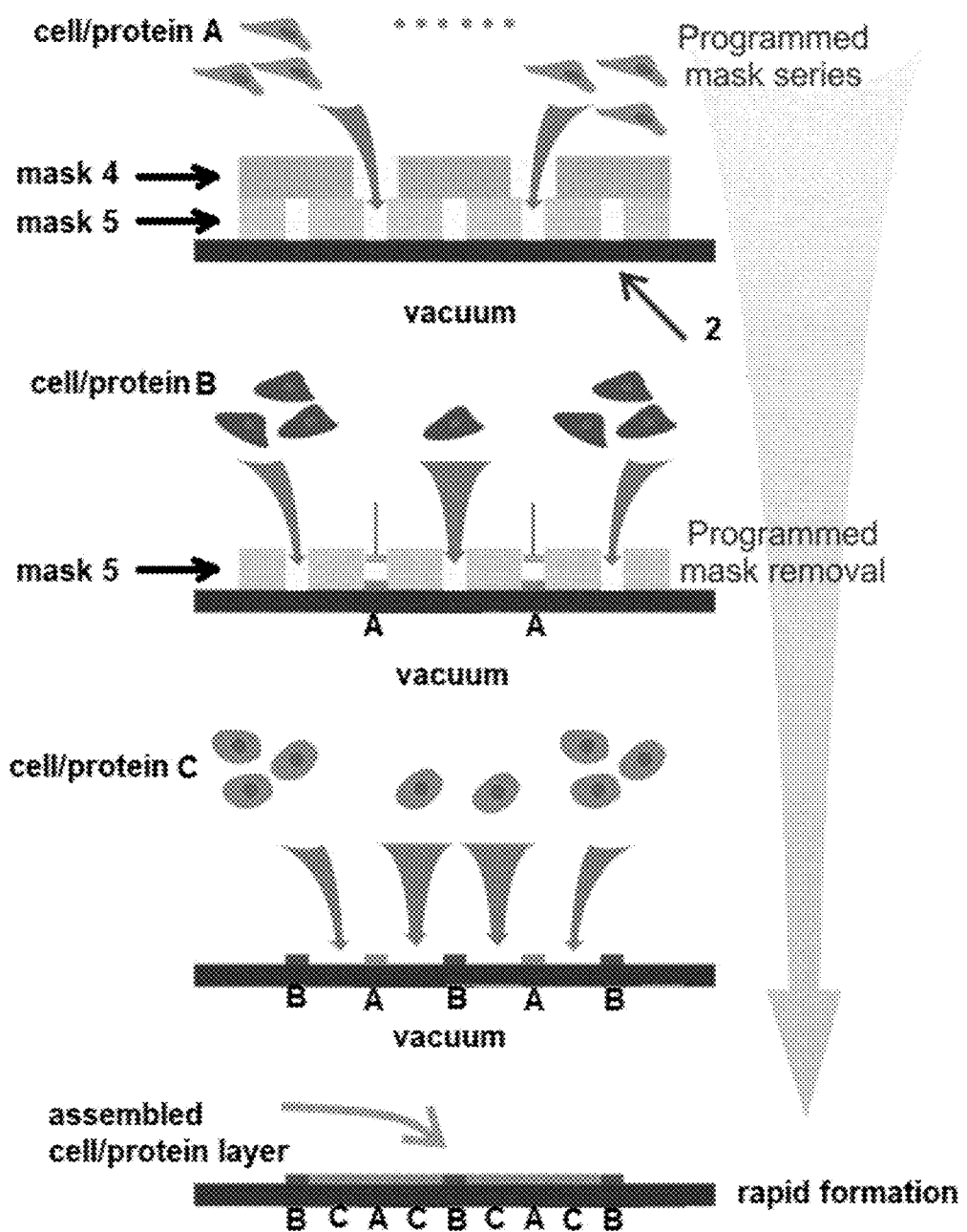
FIG. 2 illustrates the sequential deposition of cells/proteins under vacuum and removal of masks for heterogeneous cell patterning: cell/protein A is selectively deposited to $MnO_2$-assembled BNP membrane 2 having masks 4 and 5 covering other surface area of the membrane; cell/protein B is then selectively deposited to the membrane after removal of mask 4; cell/protein C is finally deposited after removal of mask 5; cell/protein A, B and C together form an assembled cell/protein layer.

FIG. 2 illustrates a sequential deposition of different cell types onto the sacrificial BNP membrane 2 and forming tissue patterns. The membrane includes a first group of masks 4 and a second group of masks 5, which can be removed at different stages for the introduction of different groups of cells. The resulting scaffold-free 3D tissues are mechanically robust. The spatially controlled patterns can be applied to the assembly of unlimited cell types.

The removal mask can be made from any suitable non-toxic material. Non-limiting examples include Polydimethylsiloxane, TEFLON®, silk, Polyacrylamide, metal and Silicon.

Another aspect of this patent documents provides a method of forming a protein or cell assembly using the scaffold described herein. The method generally includes depositing a protein or a first group of cells on a first surface of the scaffold; and applying vacuum (or negative pressure) to a second surface opposite to the first surface of the membrane. The vacuum or negative pressure can be initiated prior to, simultaneously, or shortly after the deposit of the cells.

The assembly of cells on the BNP membrane is guided by physical forces without requiring a strong cell-cell interaction initially. Therefore, the method is expected to be applicable for making any cellular patterns of interest. For example, the patterning of cells has been demonstrated from: i) different germ layers including endoderm, mesoderm and ectoderm without requiring specific protein coatings; and ii) both adherent cell and non-adherent cells. In particular, the assembly of non-coherent monocytes is almost impossible using any of the conventional methods due to their lacking surface integrins for intercellular binding or extracellular matrix (ECM) attaching. Given that mononuclear cells in human blood have been clinically used for treating human diseases such as spinal cord injury, the "monocyte tissue" fabricated by this method may allow spatially controlled transplantation of monocyte with high densities. Non-limiting examples of the cells that can form an assembly with the present method include stem cell, endoderm, mesoderm, ectoderm, non-adherent cells, disease cells (e.g. cancer cells).

The number of layers and thickness of the cell sheet is tunable by one or more of the following: 1) controlling the concentration of cells in the cell suspension during vacuum deposition; 2) controlling the deposition time of the cell suspension during vacuum deposition; and 3) stacking two or more cells sheets together. The cell assembly or sheet can thus include 1, 2, 3, 4, 5, 6, 7 or 8 layers of cells. In some embodiments, the cell assembly or sheet includes at least 2, at least 3, at least 4, at least 5, at least 6, at least 7 or at least 8 layers of cells. Further, 3D cell sheet or tissue structures with a high cell density of over about $10^5$ or over about $10^6$ cells/cm$^2$ can be obtained.

Due to the vacuum filtration, the whole process of cell assembly only takes 2-20 minutes, which are significantly shortened compared to spheroid or cell sheet formation and provide timely cell therapy to injuries or diseases. In some embodiments, the vacuum or negative pressure is applied for about 5, 6, 8, 10, 12, or 15 minutes to form a cell assembly. In some embodiments, the method employs vacuum filtration which is capable of generating multi-layered cell sheet within 20 minutes, within 30 minutes, within 45 minutes, within 1 hour, or within 2 hours.

As described above, the membrane may contain one or more groups of removable masks covering one or more portions of the first surface of the membrane. The unmasked area on the first surface can be patterned to the shape of a tissue. For instance, the first surface may be covered with one, two, three or more groups of masks, which may be separate from each other or partially with each other.

The sequential removal of the masks can also provide a desirable pattern for forming cell assembly. For instance, after removal of a first group of the masks, a patterned area becomes available for depositing a second group of cells to the first surface of the membranes. Likewise, after removal of a second group of the masks, a patterned area becomes available for depositing a third group of cells to the first surface of the membranes.

Accordingly, various heterogeneous cell assembly can be prepared. Non-limited examples include MSC/C2C12-derived myotube, MSC/fibroblast, MSC/macrophage, fibroblast/macrophage, neural stem cell/fibroblast, neural stem cell/macrophage. In some embodiments, the heterogeneous cell assembly has an average error diffusion of about 1.0%, about 1.5%, about 1.7%, about 2%, about 2.5%, or about 4% between the different groups of cells.

Besides assemblies having heterogeneous cell patterns, a protein-cell hybrid assembly can be similarly prepared. For instance, after removing a first group of the masks, protein can be deposited to the exposed area on the first surface of the membrane. Alternatively, protein is deposited to unmasked area on the membrane, and after subsequent removal of the first group of masks, the cells can be deposited on the newly exposed area.

The cell sheets or tissues can be readily harvested and retain their high cell densities and 3D structures. The degradation can be achieved by contacting the membrane with a deducing agent. Agents effective in converting Mn(IV) to Mn(II) includes for example vitamin C, oxylates and glutathione. Various other reducing agents can also be used as long as they do not influence cell viability.

A protein assembly containing one or more different types of proteins can be similarly prepared as described above for the cell assembly. Further, a protein-cell hybrid assembly can also be prepared with the method, which involves depositing the protein and cells sequentially on the scaffold surface. One or more groups of masks can also be installed for the formation of a patterned assembly. These groups of masks can be introduced at the outset of the fabrication process, or before the deposition of a new group of cells or protein during the process. For instance, after the deposition of the protein, a first group of masks is attached and leave only the uncovered area for depositing the cells. In some embodiments, the protein is deposited before one or more groups of cells. In some embodiments, the protein is deposited after one or more groups of cells.

A related aspect of this patent document provides a protein or cell assembly prepared from the method described herein. The assembly can be a protein or cell sheet or a tissue, which has a single layer or a multiple layers of cells.

A further aspect provides a method of treating a disease or condition in a subject by implanting to the subject the protein or cell sheet or tissue prepared according to the method described herein. Given the complex cellular types in diseased and injured human tissues and limitations of conventional cell patterning approaches, the present method provides a versatile solution for advanced cell therapy, precision disease or tissue modeling, wound healing, and many other areas. For instance, unlike cell injection or cell sheet-based monolayer transplantation, the present method can allow instant covering of injured area and protect it from contamination. Further, the tissue generated according to the present method can have more robust secretion of trophic factors to suppress inflammation and promote regeneration of the injured area based on its 3D structures with high cell densities and cell-cell interactions.

There have been many clinical applications of cell therapy. With the present method, cell assemblies of almost any cell type and in a scaffold-free form can be broadly applied for any cell therapy process to improve the treatment or avoiding side-effects from scaffolds. An additional exemplary application is disease modeling. The field of personalized medicine is rapidly rising and it heavily relies on a precise disease modeling. The method disclosed herein that can precisely recapitulate the heterogenous and dense tissue structures can provide unique solutions. A further exemplary field of application is protein delivery. Precisely engineered protein assemblies, alone or in combination with cell assemblies, can be manufactured to sustainable release protein therapeutics for treating many different diseases.

A further aspect provides a kit including the scaffold disclosed herein and an instruction manual. The instructions can be in a print out form or an electronic form for example saved in a CD. The kit may also include one or more of tissues or cells, buffers, mask removal agents, vacuum, and other components for constructing cell assemblies.

EXAMPLES

Example 1

As illustrated in FIG. 2, $MnO_2$ microparticles were synthesized based on a redox reaction between $MnCl_2$ and $H_2O_2$. Specifically, 3.2 gram of tetramethylammonium pentahydrate was dissolved with 20 ml 5% (weight percent) $H_2O_2$. Then, 10 ml de-ionized water was added with 0.594-gram $MnCl_2$ tetrahydrate dissolved under fast stirring. After four hours, the stirring speed was reduced and continued overnight. The $MnO_2$ microparticles are then purified by ethanol and water washing for three times each, and then re-suspended into water at a concentration of 5-15 mg/ml.

A vacuum filtration strategy was used to form the 3D membranes. On top of a polymer membrane with average 450 nm pore size, the microparticles were filtered through with controlled volume and time; the formation of dark-colored $MnO_2$ microparticle assembled membrane was observed. Afterwards, salt buffers such as phosphate buffered saline were filtered through to stabilize the membrane by enhancing the interactions between different microparticles. The membrane can be then detached from the underneath membrane by using physical detachment or via the assistance of a metal frame. Based on the SEM of BNP membrane, a homogenous 3D porous structure with an average pore size around 100 nm was observed.

Meanwhile, the porous structure can also support efficient vacuum flow with filtration speed of ranging from about 0.2 to about 2.5, from about 0.5 to about 2.5, from about 0.5 to about 2.0, from about 0.5 to about 1.5, from about 1.0 to about 2.5, from about 1.0 to about 2.0, from about 1.0 to about 1.5, or from about 1.0 to about 1.2 mL/(cm$^2$·min) to meet the need for vacuum-induced cell assembly. 2D $MnO_2$ nanosheets with the high surface area have also demonstrated a high biodegradability and they can readily form 3D membranes; however, these 2D planar nanosheets assembled membrane shows significantly reduced porosities and dramatically impeded the vacuum flow.

Most importantly, this method successfully generates highly biodegradable 3D microparticles with a high surface area and porosity. The degradation was monitored based on a sharp color change from dark brown [Mn(IV)] to colorless [Mn(II)]. It was observed that a higher aspect ratio can increase the surface area while ion doping can introduce defective sites, thereby accelerating the degradation speed. Combining both strategies, a fast degradability (>10 mg/s) under 1 mg/ml vitamin C buffered solution was achieved. The degradation condition is well-tolerated by four representative cell lines [e.g., adipose-derived mesenchymal stem cells (ADSC)].

The MnO2 nanosheets can be simply prepared from the ultrasonication of the as-synthesized MnO2 microparticle aqueous solution for over ten hours. The nanosheets were characterized by Zeta sizer, Zeta potential, X-ray Photoemission Spectroscopy, UV-Vis absorption spectroscopy and TEM regarding their hydrodynamic size, surface charge, elemental composition, light absorption and shapes, respectively. The nanosheets can be re-stacked into microparticles by addition of salts (e.g., lithium chloride, zinc chloride, iron sulfate, etc.) or other molecules containing cationic ions.

Example 2

The general procedures of depositing proteins are identical to the deposition of cells. Briefly, by placing a removable mask on top of the BNP membrane, concentrated protein solution (30 mg/ml gelatin protein in phosphate buffer in this case) was filtered through the mask under the vacuum forces until the liquid flow stopped. Afterwards, the BNP membrane was dissolved under reducing conditions (e.g., 1.0 mg/ml Vitamin C) to retrieve the protein assemblies. The shapes and sizes of protein assemblies were characterized using the optical microscope and fluorescent microscope.

The fabrication of protein-cell hybrid patterns using the BNP membrane was performed as follows. Briefly, after forming the protein assemblies on the BNP membrane using the first mask with defined shapes (circular shape with 0.5 cm in this case), a second removable mask was positioned with specific shapes (1.0 cm by 1.0 cm square in this case) and filtrated cell solution (U87-EGFP cell line suspended in Opti-MEM media in this case). Afterwards, the protein-cell assemblies were retrieved with a protein-core and cell-shell structure by dissolving the BNP membrane using Vitamin C solution. The protein-cell assemblies were characterized by optical and fluorescent microscope regarding the core-shell patterns of cells and proteins. The protein-cell hybrid assembly can be used for different applications including for example enhancing stem cell differentiation.

Example 3

Scaffold-free tissues assembled from human adipose-derived mesenchymal stem cells (hADSCs) were investigated. Mesenchymal stem cell (MSC) is perhaps the most widely used and tested cell lines for clinically relevant regenerative medicine and immune modulation; utilizing adipose-derived MSCs as cell source can mitigate the donor's pain. By connecting the BNP membrane to the controlled vacuum, hADSCs in a cell suspension can be readily assembled onto the membrane following the pressure field. By degrading the BNP membrane in the Vitamin C supplemented media, scaffold-free hADSC tissues can be then harvested. The cell assembly process was monitored based on the impeded media filtration while the fast degradation of the BNP membrane can be directly detected by the disappearance of the dark-colored membrane.

Due to the vacuum filtration, the whole process of cell assembly only takes 5-10 minutes, which are significantly shortened compared to spheroid or cell sheet formation and provide timely cell therapy to injuries or diseases. Also, 3D tissue structures with a high cell density of over $10^6$ cells/$cm^2$ can be obtained, which is well improved compared to previous reports and approaching cell densities of natural human tissue. Such high cell density was well preserved in the scaffold-free tissues after cleavage of BNP membrane, which was characterized under an optical microscope.

To better observe the 3D structure, cell nuclei and cytoskeleton were stained with Hoechst (blue) and phalloidin (red) respectively. From the fluorescent images of hADSC tissue, it was observed that polarized cell morphologies densely packed into multiple layers. From the representative tissue cross-section images, it was confirmed the 4-6 layered 3D structures from the nuclei staining. Equally importantly, such layered 3D tissue structures can be precisely controlled from single layer up to 8 layers using the present method by simply control the cell density and deposition time during vacuum filtration. Given their 3D structure and a high cell density, it was hypothesized the scaffold-free tissues generated by the present method would have high mechanical robustness as well, which is an important factor in stem cell biology and during surgical transplantation.

To this end, tissues were fabricated by the present method using commonly used surgical tools and it was found that they can be easily manipulated by a tweezer up to 170% of its original length for more than 10 cycles without introducing any defects on the tissue, which is comparable to the 3D tissues generated by 3D bioprinting. Meanwhile, the tissues fabricated by the method described herein are flexible and can easily attach to the artificial wounds generated on PDMS. During the repetitive bending of the artificial wound, the tissue remained intact and adherent, suggesting its good potential for suture-less transplantation. Most importantly, the 3D tissue fabricated by the present method maintained good cell viabilities after culturing in cell media for 2 days, which was tested using a live-dead cell assay. Overall, the present method represents a unique method for scaffold-free tissue engineering and advanced disease modeling by fast assembling cells into 3D tissues with high mechanical robustness, high cell densities and good cell viability.

Human tissues are constructed from a wide variety of cell types and they are organized in varying spatial patterns to achieve specific tissue functions. Here, precise cell patterning was achieved in the macroscopic scale and microscopic scale by controlling the vacuum field on BNP membrane using porous polymeric masks. Using hADSCs, patterning of a single cell type was first demonstrated. The semitransparent scaffold-free tissues patterned from the present method well followed the shapes of porous membrane which include circular, bi-circular and cross shapes. To better observe the cell shapes, fluorescent cell lines were used and the patterning was repeated. Consistent with the photographs from hADSC patterning, the fluorescent cells can be precisely assembled into the same shapes with low deviations from the original pattern design.

To confirm whether the present method could also generate more complex cellular patterns existent in human tissues, human endothelial cells were labeled with green dyes and patterned into branched shapes to mimic blood capillaries. Such a branched structure is closely related to nutrient diffusion in peripheral veins and is particularly valuable for disease modeling. Meanwhile, to confirm whether precision patterning of more microscopic structures can be realized, an array of circular spheroid patterns was created with the present method with diameters down to 75 μm from GFP-labelled cells.

Among the 50 cell patterns analyzed, 47 showed identical circular shape with a very narrow diameter distribution. Such high resolution in microscopic systems has been challenging in conventional protein-based, microwell-based or dielectrophoretic cell patterning techniques and would be critical to enable precision tissue modeling and engineering. Equally importantly, the assembly of cells in the present method is guided by physical forces without requiring a strong cell-cell interaction initially; therefore, theoretically, the method can apply to making any cellular patterns of interest.

For example, we demonstrated patterning of cells from: i) different germ layers including endoderm, mesoderm and ectoderm without requiring specific protein coatings; ii) both adherent cell and non-adherent cells (e.g. human monocytes). In particular, the assembly of monocytes is almost impossible using any of the current methods due to their lacking surface integrins for intercellular binding or extracellular matrix (ECM) attaching. Given that mononuclear cells in human blood have been clinically used for treating human diseases such as spinal cord injury, the "monocyte tissue" fabricated by Adcell may allow spatially controlled transplantation of monocyte with high densities.

Furthermore, as heterogenous cellular patterning with varying structures can even more challenging and highly relevant in many complex disease systems, a stitching strategy was adopted to obtain a library of multicellular tissue patterns using varying fluorescently labeled cell lines. For instance, the shapes of multicellular patterns from "circle in a circle", "dots in a square" to a more complicated "circle and Y shape in a square" tricellular system can be controlled. The cellular diffusion across the boundary of heterogeneous cell patterns was investigated, which is a common issue in multicellular patterning and can impair the accuracy of disease modeling. From the bicellular patterning results, an average error diffusion of 1.7% can be found across the pattern boundaries, which is comparable to commonly used protein-based or bioprinting-based patterning approach and suggests a good accuracy for disease modeling.

Moreover, similar to single cell patterning, the multicellular patterning can apply to varying cell types without much restriction. For example, conventional protein-based cell patterning technique is usually limited to bicellular patterning with predefined properties. Spheroid-based 3D bioprinting can achieve patterning of more than three cell types but they are restricted to cell types with spheroid-forming ability. Hydrogel-based tissue printing avoids such restrictions on cell types, but the intercellular communications are largely compromised. Lastly, it was further demonstrated the patterned tissues can be readily harvested in their scaffold-free form using the same protocol mentioned above. The flexible scaffold-free tissues retained their high cell densities and 3D structures from the cross-section images. Given the complex cellular types in diseased and injured human tissues and limitations of current cell patterning approaches, the present method could provide a versatile solution for advanced cell therapy and precision disease modeling.

Example 4

To demonstrate an immediate example for disease modeling using the present method, a wound inflammation model was constructed as a-proof-of-concept and applied to evaluate the therapeutic potential of hADSCs from varying human sources. Tissue wound is one of the most common injuries in human. To treat large wounds, hADSCs-based wound healing and anti-scarring are one of the recently developed therapy and have been already on clinical trials. Nevertheless, critical challenges remain as current sources of hADSCs typically vary significantly which can further lead to different therapeutic outcome. Therefore, it would be much beneficial to develop a simple but meaningful model that provides a precise evaluation of the therapeutic effects of specific hADSC sources before each transplantation.

Conventionally, a fibroblast-based scratch assay is most often used. However, many studies have suggested the important role of macrophage-fibroblast interactions on wound closure which is overlooked in the scratch assay. While macrophage-fibroblast co-culture has also been previously developed, they didn't fully reconstitute the important 3D extracellular micro-environment such as matrices that are supporting cell migration. To this end, a human macrophage-fibroblast co-culture was created that mimics wound structure with biomimicry extracellular microenvironments.

Briefly, a macrophage-fibroblast "core-shell" tissue was first generated then placed and finally removed the BNP membrane in situ by Vitamin C supplemented media to form the 3D scaffold-free tissue model. As a control, a conventional scratch assay was performed using human fibroblasts. To distinguish the two different cell types, macrophages were stained with red and fibroblasts were stained with green. Throughout the process of 7 days, it was found that compared to scratch assay, expansion of fibroblast boundary significantly slowed in the model and are closer to the rates of scar removal in human patients. Such significant differences could be attributed to the interactions between fibroblast and macrophage as well as the 3D microenvironment that better mimics in vivo ECM. After confirming the successful generation of wound model, patient-derived hADSCs were screened using the developed model and no hADSC co-culture model was used as a control. To match the conditions in clinical treatments, hADSCs are directly from human donors and passages below five were used. The healing assays were continued for seven days and wound closure was recorded every two days based on the boundary of fibroblast.

After identifying proper donor cells for wound healing, scaffold-free tissues for advantageous wound repair in vivo was demonstrated. While normally small wounds can heal without special treatment, such healing processes are significantly impeded in diabetic patients. Also, diabetic patients usually have impaired immune systems and are more prone to contamination. Therefore, transplantation of the 3D scaffold-free hADSC tissue could provide a unique solution: first, unlike cell injection or cell sheet-based monolayer transplantation, the hADSC tissue can allow instant covering of injured area and protect it from contamination a similar advantage from scaffold transplantation or skin graft; second, it was also hypothesized that tissue generated by the present method can have more robust secretion of trophic factors to suppress inflammation and promote regeneration of the injured area based on its 3D structures with high cell densities and cell-cell interactions.

To test this hypothesis, in vitro anti-inflammation assay and tube-formation assay was performed by using hADSC-based co-culture models. Same cell culture systems without any treatment or with 2D confluent cell layers were used as controls. Based on the qRT-PCR results, as expected, the 2D culture of hADSCs demonstrated a robust anti-inflammation compared to a no-treatment control. Most importantly, co-culture of macrophage with 3D hADSC tissues showed even further improvements in down-regulating most critical inflammatory genes (e.g. TNF-$\alpha$ and IL-b) comparing to both no treatment control as well as 2D hADSC treated group. Similarly, based on the significantly increased tube numbers in the tube formation assay, 3D hADSC tissue demonstrated a better potential in promoting vascularization compared to 2D monolayers, which are consistent with previous literature reports.

After confirming the robust therapeutic effects of 3D hADSC tissues in vitro, in vivo stem cell transplantation assay was performed in a murine diabetic model. Consistent with in previous vitro experimental results, the 3D hADSCs can be reliably transplanted by surgical tools and they strongly adhere to the wounds throughout the 1 week of the test. As such, the wound fast closed in an experimental condition. In contrast, the control without any treatment did not show any significant wound healing which is representative of typical diabetic wounds. Equally importantly, by harvesting the tissues 1-week post-transplantation, it was also observed higher vascularization in the experimental condition, which is another critical indicator of accelerated healing of the diabetic wound.

In parallel, to study the therapeutic effects from the 3D hADSC transplantation, immunostaining on proliferation (PH3) and inflammation (CD11b) markers were also investigated. Consistent with in vitro results, 3D hADSC treated a condition not only stimulated more significant growth of cells based on the proliferation markers but also showed less inflammation compared to the control. By performing hematoxylin and eosin (H&E) staining, better structural integrity of the injured tissue in the 3D hADSC treated condition could be concluded.

Additionally, hADSCs using polymer scaffolds was transplanted and compared the results to the scaffold-free transplantation. 1-week after transplantation, based on nuclei staining images, a clear barrier between transplanted cells and the injured area was observed. This could be due to a slow degradation rate of the polymer scaffolds, which leads to impeded integration between transplanted cell and injury. On the other hand, no such barriers were found in the scaffold-free transplantation conditions.

Even though the therapeutic potential of hADSC has been previously evaluated in vivo, the 3D hADSC is unique as it simultaneously demonstrates a fast wound closure, easy surgical manipulation, scaffold-free transplantation and robust modulation of the disease microenvironments, all of which are highly desired for diabetic wound healing. Furthermore, given the large library of homogenous and heterogeneous tissues generated by the present method, it could be broadly applied to treating many other diseases and injuries.

Many modifications and other examples of the disclosure set forth herein will come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims.

Moreover, although the foregoing descriptions and the associated drawings describe aspects of the disclosure in the context of certain example combinations of structural elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A biodegradable nano porous (BNP) membrane scaffold for forming a protein or a cell assembly, comprising a plurality of nanosheet layers consisting of ultrasonicated porous manganese dioxide ($MnO_2$) particles having an average diameter ranging from about 200 nm to about 100 μm, wherein
   (i) the scaffold comprises pores with an average diameter ranging from about 1 μm to about 50 μm; and
   (ii) the particles comprise a plurality of nanosheets, wherein the nanosheets have an average lateral size ranging from about 1 nm to 1 μm, and wherein the nanosheets are assembled in random directions in the particles to form porous channels.

2. The scaffold of claim 1, wherein the particles are degradable by a reducing agent.

3. The scaffold of claim 1, wherein the particles degrade at a rate of greater than about 10 mg/s under 1 mg/ml vitamin C buffered solution.

4. The scaffold of claim 1, wherein the particles comprise $MnO_2$ doped with a dopant selected from the group consisting of zinc, lithium, iron, and any combination thereof.

5. The scaffold of claim 1, further comprising a first group of one or more removable masks covering a first portion of the first surface of the scaffold.

6. The scaffold of claim 5, further comprising a second group of one or more removable masks covering a second portion of the first surface, wherein the second group are separate from or overlap with the first group.

7. The scaffold of claim 5, wherein the masks comprise a polymer.

8. The scaffold of claim 5, wherein an unmasked area on the first surface is patterned to the shape of a tissue.

9. A method of forming a protein and/or a cell assembly or a hybrid thereof, comprising:
   (a) depositing a protein and/or a first group of cells on a first surface of the scaffold of claim 1; and
   (b) applying vacuum (negative pressure) to a second surface opposite to the first surface of the scaffold.

10. The method of claim 9, wherein the scaffold comprises one or more groups of removable masks covering one or more portions of the first surface of the scaffold, wherein the method further comprises removing a first group of the one or more groups of the masks and depositing a second group of cells to the first surface of the scaffolds.

11. The method of claim 10, further comprising removing a second group of the one or more groups of the masks and depositing a third group of cells to the first surface of the scaffold.

12. The method of claim 9, wherein the scaffold comprises one or more groups of removable masks covering one or more portions of the first surface of the scaffold, wherein the protein is first deposited to the first surface of the scaffold, and wherein the method further comprises removing a first group of the one or more groups of the masks prior to depositing the first group of cells to the first surface of the scaffolds.

13. The method of claim 9, further comprising treating the scaffold with a reducing agent to separate the protein and/or the cell assembly or the hybrid thereof from the scaffold.

14. The method of claim 9, wherein the cell assembly has a cell density of over $10^6$ cells/$cm^2$.

15. A method of treating a condition in a subject, comprising implanting to the subject in need thereof the protein and/or the cell assembly or the hybrid thereof produced according to claim 9.

16. The method of claim 15, wherein the condition is an open wound.

* * * * *